United States Patent Office 2,990,339
Patented June 27, 1961

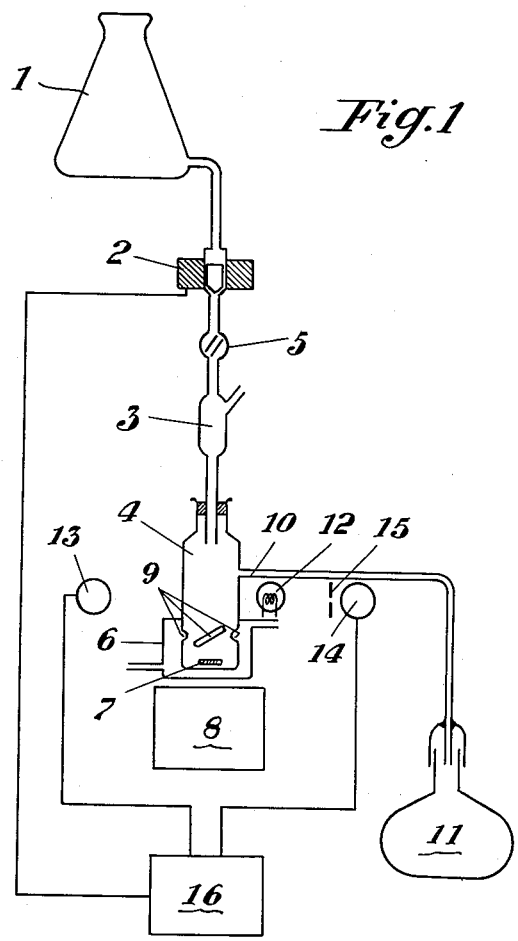

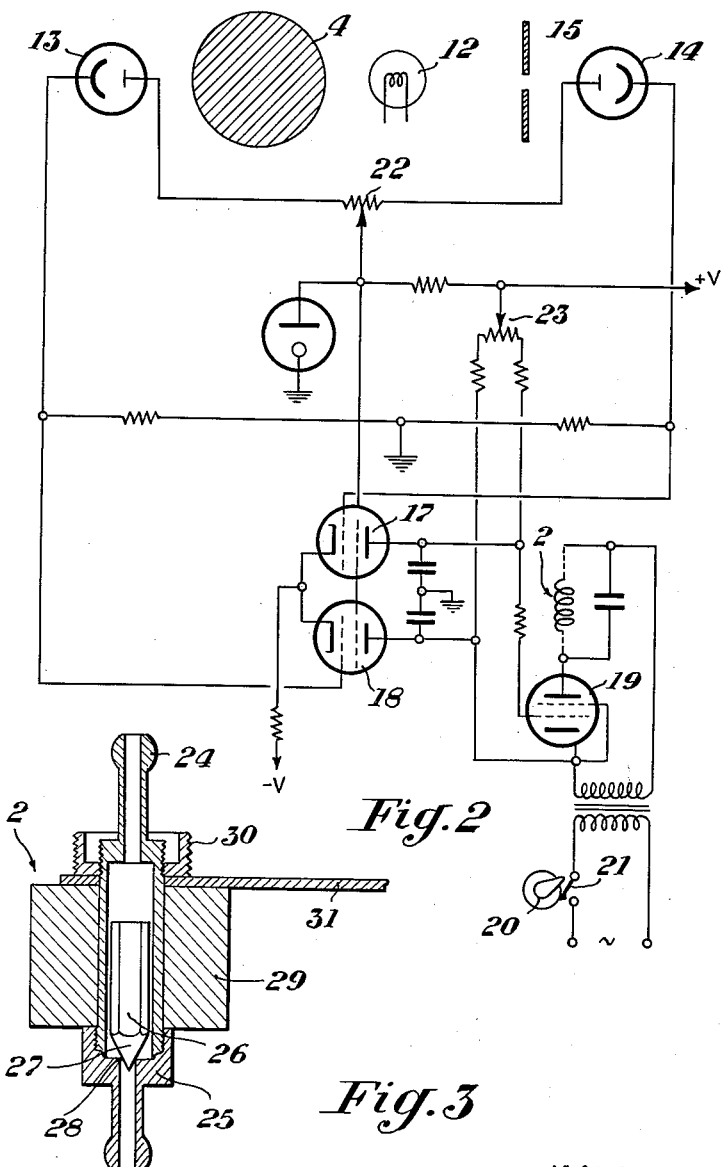

2,990,339
APPARATUS FOR AUTOMATICALLY TESTING THE BIOLOGICAL PROCESSES ACCORDING TO THE TURBIDITY OF THE MEDIUM
Marco Frank, Rome, Italy, and Gio Batta Gori, Pittsburgh, Pa., assignors to Fondazione Emanuele Paternó, Rome, Italy, a scientific research institute of Italy
Filed June 29, 1959, Ser. No. 823,388
Claims priority, application Italy July 11, 1958
10 Claims. (Cl. 195—139)

The present invention relates to an apparatus for automatically testing the biological processes according to the turbidity of the medium.

It is known that many attempts of solving the problem of testing the biological processes, and particularly the continuous trypsinization of the animal tissues have been made by several workers with various success, but to our best knowledge no apparatus for the automatic control of the course of the operation has been proposed up to date.

This invention aims to propose an apparatus automatically testing such a process and requiring the presence of no operator.

In order to embody the automatic test, according to this invention, the turbidity of the medium where the process is carried out is taken as reference element, and, for instance in the case of the trypsinization, the concentration of the cells within the liquid itself is taken as reference datum. Depending upon this datum, the flow of the process feed solution towards the flask where the process is carried out, is adjusted.

More particularly, the variations of the turbidity of the medium where the process is carried out, is measured with one or more photosensitive cells while for automatically controlling the flow of the feed solution of the considered biological process, use is made of an electromagnetic cock, free from packings and thus suitable for any liquid.

Also, according to this invention, for carrying out the process to be tested, use is made of a flask for biological processes, provided with indentations suitable to ensure the necessary turbulence for the thorough mixing.

Finally, the electric section of the apparatus utilizes a differential circuit with a potentiometer to balance the photocells within a range of values of intensity of the light source and more specifically a pentode differential circuit is used to render independent the equilibration of one stage from the bias of a subsequent tube, or of a symmetric stage connected across the plates of the pentodes.

One preferred form of this invention will be hereinafter described with reference to the attached drawings, wherein:

FIG. 1 shows a general diagram of automatic test;
FIG. 2 shows the circuit of the electronic apparatus with the associated photocells and the electro-magnetic cock, and
FIG. 3 is a cross-sectional view of the electro-magnetic cock.

With reference to the drawings and particularly to the diagram of FIG. 1, the feed solution is contained within the container 1; said solution can be delivered through the electromagnetic cock, generally denoted at 2, and which will be described in more detail later, to be delivered to the receptacle 3 destined to improve the mixing conditions of the solution within the flask 4. The amount of the feed solution which is to be delivered at each opening operation of the cock is adjusted by the adjustable orifice 5.

The flask 4 where the process is carried out is rendered thermally stable by the jacket 6 surrounding the lower portion of the flask, a forced water circulation being provided through said jacket. The medium wherein the process is carried out is stirred by a little metal bar 7 coated with plastic material and driven by a rotary magnet 8. The flask is further characterized by the presence of the indentations 9 in the lower portion of the glass wall, inwards and downwards projecting as shown in the figure, and destined to impart a downwards component to the stirred liquid to originate the necessary turbulence for an effective mixing. The flask 4 is also provided with the spillway 10 wherefrom the suspension of cells outflows, said suspension being collected within the container 11.

The volume of the solution within the flask 4 is constant and the outflow through the spillway 10 is caused by the inflow of the feed solution.

During the course of the process the concentration increases (in the specific case as above referred to, of the trypsinization mixture, increases the concentration of the cells) and therefore increases the turbidity.

On one side of the flask 4 is located the lamp 12 and on the opposite side of the flask is located the photoelectric cell 13. Another photoelectric cell 14 receives the direct light from the lamp 12 through the adjustable slit 15. The latter is adjusted according to the optimum turbidity requested for the medium wherein the process is carried out. The two photocells 13 and 14 are connected to an electronic apparatus 16, which depending upon the currents of the photocells controls the opening of the cock 2.

FIG. 2, where for the already described parts have been maintained the same reference characters, shows more particularly the circuitry of the electronic apparatus with the associated photocells and the electromagnetic cock. The photocells 13 and 14 are connected to the grids of two pentodes 17 and 18 mounted in a differential amplifying circuit. The voltage differential existing between the plates of the pentodes 17 and 18 renders more or less negative the grid of the thyratron 19. When the timing device 20 closes the switch 21 in the anodic circuit of the thyratron 19 an alternate voltage is inserted. If the photocell 13 is less illuminated than the photocell 14, the plate of the pentode 18 is at a voltage markedly lower than the voltage of the plate of the pentode 17, and even when the switch 21 closes, the thyratron does not conduct and the electromagnetic cock 2 (electrically shown in the diagram) remains closed. The potentiometer serves for equalizing the characteristics of the photocells in the working zones, while the potentiometer 23 serves to select the suitable bias for the thyratron 19.

The FIGURE 3 shows the cross-section of the electromagnetic cock 2. This cock, which is designed for operating in vertical location, is of the axial type flow and includes a central body comprising two pieces 24 and 25 made of non-magnetic stainless steel, and a glidable piece 26 made of magnetic stainless steel, having a hexagonal cross-section. The lower end 27 of the piece 26 has a conical shape and is received into the corresponding conical seat 28 of the piece 25, the seal being ensured by grinding the parts. About the central part is located the coil 29 which when energized by the current of the thyratron 19 (FIG. 2) causes the piece 26 to be raised and therefore the cock to be opened.

The coil is retained by the knurled bush 30 which fastens the unit to the support 31.

While a specific embodiment of the invention has been shown and described in detail to illustrate the application of the invention principles, it will be understood that the invention may be embodied otherwise without departing from such principles.

We claim:

1. A device for controlling the feed of liquid to a solution in which a turbidity-causing biological process takes place, responsive to variations in the turbidity of said solution during said process, said device comprising a flask comprising means for feeding fresh liquid thereto and overflow means for discharging processed solution therefrom, electromagnetically controlled valve means associated with said liquid-feeding means, stirring means for agitating the contents of said flask and maintaining an even turbidity therein, an electronic circuit comprising a first and a second photoelectric cell; a light source so disposed as to illuminate said first cell directly and said second cell through the evenly turbid solution in said flask; adjustable slit means interposed in the path of light from said light source to said first cell and adapted for adjusting the illumination of said first cell to a value corresponding to a determined turbidity in said solution; said electronic circuit further comprising energizable electronic valve means being responsive to a voltage difference between said first and second cell, and timing means for energizing said electronic valve means automatically at intervals; said electronic valve means being so connected to said electromagnetically controlled valve means as to actuate the latter to permit passage of liquid therethrough, whenever energization of said electronic valve means coincides with a voltage difference between said first and second cell caused by the turbidity of said solution in said flask exceeding the turbidity corresponding to the illumination value to which said slit means has been adjusted.

2. A device as described in claim 1, wherein said electronic circuit further comprises voltage difference amplifying means.

3. A device as described in claim 1, wherein said electronic valve means is a thyratron.

4. A device as described in claim 2, wherein said amplifying means is a pentode differential circuit, and said electronic valve means is a thyratron.

5. A device as described in claim 4, wherein said pentode differential circuit comprises two pentodes having their grids connected to said first and second photoelectric cell, respectively, and their plates connected to said thyratron.

6. A device for automatically testing the course of a biological process in a solution and feeding at intervals a liquid thereto, responsive to the variation of the turbidity of said solution, during said process, which device comprises, in combination, a flask adapted for containing a determined volume of the solution in which the biological process takes place, conduit means for introducing new liquid into said flask, overflow means for removing excess processed solution from said flask, stirring means for agitating the solution in said flask, a light source disposed on one side with respect to said flask, a first photoelectric cell directly illuminated by said light source, adjustable slit means interposed between said first photoelectric cell and said light source for adjusting the illumination of said cell from said source to a value corresponding to a determined turbidity, a second photoelectric cell located at the opposite side of said flask with respect to said light source and adapted for receiving the light from said source passing through said solution in said flask, electromagnetically controlled valve means in said conduit means, electrical circuit means connecting said first and second photoelectric cells and comprising voltage difference amplifier means, thyratron means electrically connected to said first and second photoelectric cells, switch means for making and breaking the feeding circuit of said thyratron means, a timing device for automatically at intervals actuating said switch means, said valve means comprising electromagnetic means connected in circuit with said first and second photoelectric cells and said thyratron so as to permit passage of liquid through said valve when making of said thyratron feeding circuit by said timing device coincides with a voltage difference between said cells caused by the turbidity of said solution in said flask exceeding the value to which said slit means has been adjusted.

7. A device as described in claim 6, further comprising a first potentiometer in series with said first and second photoelectric cells to balance the response of said photoelectric cells, and a second potentiometer acting on the polarization of said thyratron and adapted for biassing, at will, the response of said electromagnetically controlled valve means to coincident making of the feeding circuit of said thyratron and occurrence of said voltage difference between said cells.

8. A device described in claim 1, wherein said stirring means comprises a stirrer located inside said flask near the bottom of the latter, rotating magnetical means outside the flask near said flask bottom and causing said stirrer to rotate, and indentations made in the inner wall of said flask in the zone overlying said stirrer, said indentations being so arranged as to impart a downward component to the movement of the liquid stirred by said stirrer, thereby increasing the turbulence of the liquid.

9. A device as described in claim 1, wherein said electromagnetically controlled valve means comprises a hollow body formed of two parts of non-magnetic stainless steel and arranged in superposed position with respect to each other, the underlying part carrying a conical valve seat, a member longitudinally slidable in the said hollow body and consisting of magnetic stainless steel, said member having a conical lower end adapted for engaging said conical seat, an electromagnetic coil mounted outwardly of said hollow body and connected in circuit with said energizable electronic valve means and adapted for moving said slidable member to open said passage of liquid through said valve means electromagnetically controlled when said electromagnetic coil is passed by a determined current through said energizable electronic valve means.

10. A device for controlling the feed of liquid to a solution in which a turbidity-causing biological process takes place, responsive to variations in the turbidity of said solution during said process, said device comprising a flask comprising means for feeding fresh liquid thereto and overflow means for discharging processed solution therefrom, electromagnetically controlled valve means associated with said liquid-feeding means, stirring means in said flask near the bottom thereof for agitating the contents of said flask and maintaining an even turbidity therein, in a zone above said stirring means and below said overflow means, an electronic circuit comprising a first and a second photoelectric cell; a light source so disposed as to illuminate said first cell directly and said second cell through the evenly turbid solution in said flask, with the optical path of the light from said light source passing through said evenly turbid zone above said stirring means and below said overflow means, adjustable split means interposed in the path of light from said light source to said first cell and adapted for adjusting the illumination of said first cell to a value corresponding to a determined turbidity in said solution; said electronic circuit further comprising energizable electronic valve means being responsive to a voltage difference between said first and second cell, and timing means for energizing said electronic valve means automatically at intervals; said electronic valve means being so connected to said electromagnetically controlled valve means as to actuate the latter to permit passage of liquid therethrough, whenever energization of said electronic valve means coincides with a voltage difference between said first and second cell occurs due to the turbidity of said solution in said flask exceeding the turbidity corresponding to the illumination value to which said slit means has been adjusted.

References Cited in the file of this patent

UNITED STATES PATENTS

| | | |
|---|---|---|
| 2,386,831 | Wright | Oct. 16, 1945 |
| 2,554,632 | Nesset | May 29, 1951 |
| 2,839,963 | Moss et al. | June 24, 1958 |

UNITED STATES PATENT OFFICE

Certificate of Correction

Patent No. 2,990,339

June 27, 1961

Marco Frank et al.

It is hereby certified that error appears in the above numbered patent requiring correction and that the said Letters Patent should read as corrected below.

Columns 5 and 6 of the printed specification were inadvertently omitted and should be inserted as part of the Letters Patent (only):

2,990,339

5 means being responsive to a voltage difference between said first and second cell, and timing means for energizing said electronic valve means automatically at intervals; said electronic valve means being so connected to said electromagnetically controlled valve means as to actuate the latter to permit passage of liquid therethrough, whenever energization of said electronic valve means coincides with a voltage difference between said first and second cell occurs due to the turbidity of said solution in said flask exceeding the turbidity corresponding to

6 the illumination value to which said slit means has been adjusted.

References Cited in the file of this patent

UNITED STATES PATENTS

| | | |
|---|---|---|
| 2,386,831 | Wright | Oct. 16, 1945 |
| 2,554,632 | Nesset | May 29, 1951 |
| 2,839,963 | Moss et al. | June 24, 1958 |

Signed and sealed this 14th day of November 1961.

[SEAL]

Attest:
ERNEST W. SWIDER,
*Attesting Officer*

DAVID L. LADD,
*Commissioner of Patents.*